United States Patent
Kagan et al.

(10) Patent No.: US 7,013,419 B2
(45) Date of Patent: Mar. 14, 2006

(54) RELIABLE MESSAGE TRANSMISSION WITH PACKET-LEVEL RESEND

(75) Inventors: Michael Kagan, Zichron Yaakov (IL); Diego Crupnicoff, Buenos Aires (AR); Ariel Shachar, Haifa (IL); Gil Bloch, Kiryat Ata (IL); Dafna Levenvirth, Jerusalem (IL)

(73) Assignee: Mellanox Technologies Ltd., Yokneam (IL)

( * ) Notice: Subject to any disclaimer, the term of this patent is extended or adjusted under 35 U.S.C. 154(b) by 846 days.

(21) Appl. No.: 10/119,808

(22) Filed: Apr. 11, 2002

(65) Prior Publication Data

US 2002/0152315 A1   Oct. 17, 2002

Related U.S. Application Data

(60) Provisional application No. 60/283,018, filed on Apr. 11, 2001.

(51) Int. Cl.
*G06F 15/16* (2006.01)
(52) U.S. Cl. .................................... 714/749
(58) Field of Classification Search ................. 714/749
See application file for complete search history.

(56) References Cited

U.S. PATENT DOCUMENTS

| | | | | |
|---|---|---|---|---|
| 4,688,214 A | * | 8/1987 | DeWitt et al. | 370/389 |
| 4,736,364 A | * | 4/1988 | Basso et al. | 370/420 |
| 4,794,589 A | * | 12/1988 | Finch et al. | 370/419 |
| 4,802,220 A | * | 1/1989 | Marker, Jr. | 380/33 |
| 6,201,791 B1 | * | 3/2001 | Bournas | 370/234 |
| 6,339,796 B1 | * | 1/2002 | Gambino | 709/248 |
| 6,438,108 B1 | * | 8/2002 | Kanljung et al. | 370/249 |
| 6,473,425 B1 | * | 10/2002 | Bellaton et al. | 370/392 |
| 6,661,773 B1 | * | 12/2003 | Pelissier et al. | 370/228 |

* cited by examiner

*Primary Examiner*—David Y. Eng
(74) *Attorney, Agent, or Firm*—Mark M. Friedman (57) ABSTRACT

A method for communication over a network includes receiving from a host processor a descriptor defining a message including message data to be sent over the network, and responsive to the descriptor, generating a sequence of packets each containing a respective portion of the message data. An indication is entered in a selected packet among the packets in the sequence, other than the final packet, requesting that a recipient of the packets acknowledge the selected packet. Following an interruption in the sequence of the packets subsequent to the selected packet, sending of the packets in the sequence resumes beginning after the selected packet.

36 Claims, 5 Drawing Sheets

RELIABLE MESSAGE TRANSMISSION WITH PACKET-LEVEL RESEND

CROSS-REFERENCE TO RELATED APPLICATION

This application claims the benefit of U.S. Provisional Patent Application No. 60/283,018, filed Apr. 11, 2001, which is incorporated herein by reference.

FIELD OF THE INVENTION

The present invention relates generally to computer network communications, and specifically to protocols and devices for reliable data communication over packet networks.

BACKGROUND OF THE INVENTION

Communication services in packet networks are commonly classified as "reliable" or "unreliable." (In a more positive light, "unreliable services" are also referred to as "best effort" services.) Reliable services guarantee that data will be accepted at the receiving end of a link in the order in which they were transmitted from the transmitting end, without loss and without duplication. For a communication protocol to support reliability, it typically must identify each individual datagram that is transmitted, and it must provide an acknowledgment mechanism that enables the receiver to inform the transmitter which datagrams it has or has not received.

In the well-known Open Systems Interconnection (OSI) communications model, the transport layer (Layer 4) is responsible for ensuring the reliable arrival of messages, as well as providing error checking mechanisms and data flow controls. The transport layer provides services for both "connection-mode" transmissions and for "connectionless-mode" transmissions. A message or other datagram generated by the transport layer may typically be broken up into multiple packets for transmission over a network. The packet payloads must then be reassembled at the receiving end to recover the original message or datagram.

The Transmission Control Protocol (TCP) is the transport layer protocol used in Internet Protocol (IP) networks for reliable, connection-mode communications. TCP is described by Postel in RFC 793 of the U.S. Defense Advanced Research Projects Agency (DARPA), entitled "Transmission Control Protocol: DARPA Internet Program Protocol Specification" (1981), which is incorporated herein by reference. TCP provides for reliable inter-process communication between pairs of processes in host computers. The information exchanged between TCP peers is packed into datagrams known as segments, each comprising a TCP header followed by payload data. The segments are transported over the network in IP packets. There is typically no relation between the boundaries of TCP segments and actual messages generated by host application protocols. Rather, the application process simply provides a stream of data to a TCP socket, typically including both message headers and payload data, and the TCP transmitter divides the stream into segments according to its own rules.

When data segments arrive at the receiver, TCP requires that the receiver send back an acknowledgment (ACK) of the data. When the sender does not receive the ACK within a certain period of time, it retransmits the data. TCP specifies that the bytes of transmitted data be sequentially numbered, so that the receiver can acknowledge the data by naming the highest-numbered byte it has received, thus also acknowledging the previous bytes. RFC 793 contains only a general assertion that data should be acknowledged promptly, but gives no more specific indication as to how quickly an acknowledgement must be sent, or how much data should be acknowledged in each separate acknowledgement. The decision as to when to send an acknowledgment is in the hands of the receiver.

Packet network communications are a central element in new high-speed, serial input/output (I/O) bus architectures that are gaining acceptance in the computer industry. In these systems, computing hosts and peripherals are linked together by a switching network, commonly referred to as a switching fabric, taking the place of parallel buses that are used in traditional systems. A number of architectures of this type have been proposed, culminating in the "InfiniBand™" (IB) architecture, which is described in detail in the *InfiniBand Architecture Specification*, Release 1.0 (October, 2000), which is incorporated herein by reference. This document is available from the InfiniBand Trade Association at www.infinibandta.org.

As described in Chapter 9 of the specification, IB supports both unreliable and reliable transport services. The reliable services include both reliable connection service and reliable (connectionless) datagram service. The reliable transport services use a combination of sequence numbers and acknowledgment messages (ACK/NACK) to verify packet delivery order, prevent duplicate packets and out-of-sequence packets from being processed, and to detect missing packets. (A "NACK" is a negative acknowledgment message, used to indicate a flaw in the received data.) For reliable transport services, an IB operation is defined as including a request message and its corresponding response. The request message consists of one or more request packets, while the response, except for remote direct memory access (RDMA) read responses, consists of exactly one packet. The response packets may either convey data requested in the request message (thus implicitly acknowledging the request) or may be acknowledgment packets. In the event of a NACK or failure to receive an ACK within a prescribed timeout period, the packets are retransmitted, beginning with the next packet serial number (PSN) after the last one that was positively acknowledged. The sender maintains a retry counter in order to determine the number of times the operation will be retried before reporting back to the host that the request could not be carried out.

To indicate that a particular request packet should be explicitly acknowledged, the requester can set a designated flag, known as the AckReq bit, in the packet transport header. The IB specification does not place any limitations on when the AckReq bit should or should not be used, and suggests only that the bit should be set in certain cases in the last packet of a given message. When the AckReq bit is not set, it is up to the receiver to determine how often it should send acknowledgments.

A host processor (or host) connects to the IB fabric via a network interface adapter, which is referred to in IB parlance as a host channel adapter (HCA). Client processes running on the host communicate with the transport layer of the IB fabric by manipulating transport service instances, known as "queue pairs" (QPs), each made up of a send work queue and a receive work queue. Communications take place between a local QP maintained by the HCA and a remote QP maintained by a channel adapter at the other side of the fabric. To send and receive messages over the network, the client initiates work requests (WRs), which cause work items, called work queue elements (WQEs), to be placed in the appropriate queues. For each work request, the client prepares a descriptor defining the operation to be performed by the HCA.

For remote direct memory access (RDMA) and send operations, the descriptor typically contains a gather list pointing to data that are to be read out of memory and transmitted as part of the message. To execute RDMA write and send operations, the HCA reads the corresponding descriptors, fetches the data specified in the gather list from the host memory, and loads the data into packets for transmission over the fabric to the remote QP. Since the gather list in a single WR may specify as much as $2^{31}$ bytes (2 GB) of data to be transmitted, while the IB fabric does not support packets larger than 4 KB, some WQEs can require the HCA to generate a large number of packets. (Each QP has its own maximum transfer unit (MTU), or maximum packet size, which may be 256, 512, 1024, 2048 or 4096 bytes.) Unlike TCP/IP, however, in which there is no fixed relation between message boundaries and packet boundaries, the IB transport layer protocol specifies that each WR and WQE corresponds to a single message. The boundaries of the first and last packet for a given WQE thus correspond to the boundaries of the message. The size of the first and subsequent packets, except for the last packet, is equal to the MTU. The last packet takes up the remainder of the message, of length less than or equal to the MTU.

In generating an outgoing message or servicing an incoming message on any given QP, the HCA uses context information pertaining to the QP. The QP context is created in a memory accessible to the HCA by the host process that sets up the QP. The host configures the QP context with fixed information such as the destination address, negotiated operating limits, service level and keys for access control. Typically, a variable part of the context, such as the current packet sequence number (PSN) and information regarding the WQE being serviced by the QP, is subsequently updated by the HCA as it sends and receives messages. For example, to service an incoming packet on a reliable connection, the HCA reads the packet transport header, which identifies the target QP, and uses the context of that QP to verify that the packet came from the correct source and that the PSN is valid (no missed packets). Based on this information, the HCA generates the appropriate acknowledgment (ACK or NACK) or other response. As another example, to generate a RDMA write request on a reliable connection, the HCA reads the WQE and retrieves necessary data from the QP context, such as the destination address, target QP and next PSN. It then accesses the host memory to fetch the required data, and sends the packet to the destination.

SUMMARY OF THE INVENTION

It is an object of some aspects of the present invention to provide improved methods and devices for transmitting data using reliable transport services. It is a particular object of some aspects of the present invention to provide methods for efficiently controlling retransmission of packets when the sender does not receive an expected positive acknowledgment of the packets. These methods are directed particularly to the needs and limitations of IB switching fabrics, but they are applicable to other types of packet networks, as well.

As described above, transport services on IB fabrics are message-oriented, in contrast to other protocols such as TCP/IP. In other words, packets or groups of packets generated by the IB channel adapter typically correspond directly to messages, with one or more packets per message, while each message corresponds to a single work request (WR) submitted to the adapter by a host application process. In the case of RDMA write and send requests in an IB fabric, a given message may comprise hundreds, or even thousands, of packets. It is possible that the responder to such a request will send an acknowledgment back to the requester only after it has received the entire message. In such a case, if the response is a NACK, or if the requester receives no response within a designated timeout period, the requester will have to regenerate and retransmit all the packets from the beginning of the message.

In response to this difficulty, preferred embodiments of the present invention provide a mechanism that enables a channel adapter to control the point at which it will resume transmitting packets after an interruption in transmission. This mechanism allows the adapter to consistently resume transmission from the middle of a message, rather than having to return to the beginning of the message as in systems known in the art. For this purpose, when the channel adapter generates a multi-packet message, it inserts an acknowledge request (AckReq) indication in certain selected packets, and not only in the final packet of the message. Typically, the channel adapter tracks the number of packets or data bytes that it has sent since the last acknowledge request, and adds the indication each time the number passes a given threshold. The regular insertion of AckReq indications allows the requester to control the flow of acknowledgments from the responder, rather than having to rely on the responder's determination as to when the acknowledgments should be sent. If the channel adapter does not receive an ACK response to one of the selected packets within the timeout period, it can resume transmission in the middle of the message, beginning immediately after the previous selected packet that was properly acknowledged by the responder. For long messages, this mechanism can provide substantial savings in resources of the channel adapter and the network, by limiting the amount of data that must be retransmitted.

A further benefit of this mechanism is that it allows the channel adapter to conveniently interrupt transmission of a message, and then resume afterwards from where it earlier left off. For example, the adapter may be preempted in the middle of sending a long, low-priority message in order to send another message of higher priority. In this case, the adapter preferably adds the acknowledge request indication to the last packet that it sends before preempting the low-priority message. When the adapter receives the requested acknowledgment, it can free the internal resources (such as cache storage) it has set aside for generating and tracking completion of the low-priority message. After completing the high-priority message, the adapter resumes transmission of the low-priority message immediately after the last packet in which the AckReq indication was set.

Although preferred embodiments are described herein with reference to a "channel adapter" and using particular features and terminology of IB fabrics and protocols, the principles of the present invention may similarly be applied, mutatis mutandis, using networks, network interface adapters and protocols of other types.

There is therefore provided, in accordance with a preferred embodiment of the present invention, a method for communication over a network, including:

receiving from a host processor a descriptor defining a message including message data to be sent over the network;

responsive to the descriptor, generating a sequence of packets each containing a respective portion of the message data, the sequence ending in a final packet containing a final portion of the message data;

entering in a selected packet among the packets in the sequence, other than the final packet, an indication requesting that a recipient of the packets acknowledge the selected packet;

sending the packets in the sequence to the recipient; and following an interruption in the sequence of the packets subsequent to the selected packet, resuming sending the packets in the sequence beginning after the selected packet.

In a preferred embodiment, receiving the descriptor includes receiving a work request (WR) from the host processor, and generating the sequence of the packets includes executing a work queue item (WQE) responsive to the work request. Preferably, executing the WQE includes placing the WQE in a send queue of a queue pair (QP) associated with a reliable transport service provided by the network. Most preferably, entering the indication in the selected packet includes noting a packet sequence number (PSN) of the selected packet in context data associated with the QP, and the method includes receiving an acknowledgment of the selected packet from the recipient, responsive to the indication, and updating the context data responsive to the acknowledgment.

Preferably, entering the indication in the selected packet includes setting an acknowledgment request flag in a header of the selected packet.

In a preferred embodiment, receiving the descriptor includes receiving a gather list, indicating addresses and lengths of the message data in a memory, and generating the sequence of the packets includes reading the message data from the memory responsive to the gather list, and entering the indication in the selected packet includes noting a point in the gather list corresponding to the message data contained in the selected packet. Preferably, resuming sending the packets includes generating the packets in the sequence beginning from the noted point in the gather list.

Preferably, entering the indication in the selected packet includes selecting the packet in which to enter the indication responsive to a predetermined quantity of the data having been sent since a preceding one of the packets in the sequence that contained the indication was sent to the recipient. Most preferably, selecting the packet includes setting a parameter indicating a threshold number of the packets, and selecting the packet includes setting the indication in at least one of the packets in the sequence every time the threshold number of the packets is sent.

Additionally or alternatively, entering the indication includes receiving an instruction to discontinue generating the packets in the sequence before generating the final packet, and entering the indication in the packet at which generating the packets is discontinued. Preferably, receiving the descriptor includes receiving a first work request to be executed on a first transport service instance having a first priority, and receiving the instruction to discontinue generating the packets includes preempting generation of the packets for the first transport service instance in order to execute a second work request on a second transport service instance having a second priority, higher than the first priority. Alternatively, receiving the descriptor includes receiving a first work request to be executed on a first transport service instance, and receiving the instruction to discontinue generating the packets includes determining that a quantity of the data sent on the first transport instance has reached a predetermined threshold, whereupon generation of the packets for the first transport service instance should be terminated in order to execute a second work request on a second transport service instance.

Preferably, the method includes receiving an acknowledgment of the selected packet from the recipient, responsive to the indication, and resuming sending the packets in the sequence includes choosing a point in the sequence after the selected packet with which to resuming sending the packets, responsive to having received the acknowledgment. Most preferably, entering the indication in the selected packet includes noting an identification of the selected packet in context data used in generating the packets, and receiving the acknowledgment includes updating the context data responsive to the acknowledgment, so as to indicate the point in the sequence at which to resume sending the packets following the interruption.

Further preferably, resuming sending the packets includes resending the packets following the selected packet responsive to failing to receive the acknowledgment of a further packet in the sequence subsequent to the selected packet. Typically, failing to receive the acknowledgment includes failing to receive the acknowledgment within a predetermined timeout period. Alternatively, failing to receive the acknowledgment includes receiving a response from the recipient reporting that it did not properly receive one of the packets in the sequence subsequent to the selected packet. In a preferred embodiment, resuming sending the packets includes, responsive to failing to receive the acknowledgment of the further packet, interrupting generating the sequence of packets, so as to resend the packets following the selected packet.

There is also provided, in accordance with a preferred embodiment of the present invention, an interface device for communication over a network, including:

a host interface, adapted to receive from a host processor a descriptor defining a message including message data to be sent over the network;

an execution unit, coupled to the host interface and adapted, responsive to the descriptor, to generate a sequence of packets each containing a respective portion of the message data, the sequence ending in a final packet containing a final portion of the message data, such that an indication requesting that a recipient of the packets acknowledge the selected packet is entered in a selected packet among the packets in the sequence, other than the final packet, the execution unit being further adapted, following an interruption in the sequence of the packets subsequent to the selected packet, to resume sending the packets in the sequence beginning after the selected packet; and a network interface, coupled to the execution unit so as to send the packets in the sequence to the recipient over the network and to receive an acknowledgment of the selected packet sent by the recipient in response to the indication in the selected packet.

The present invention will be more fully understood from the following detailed description of the preferred embodiments thereof, taken together with the drawings in which:

DETAILED DESCRIPTION OF PREFERRED EMBODIMENTS

Figure 1:
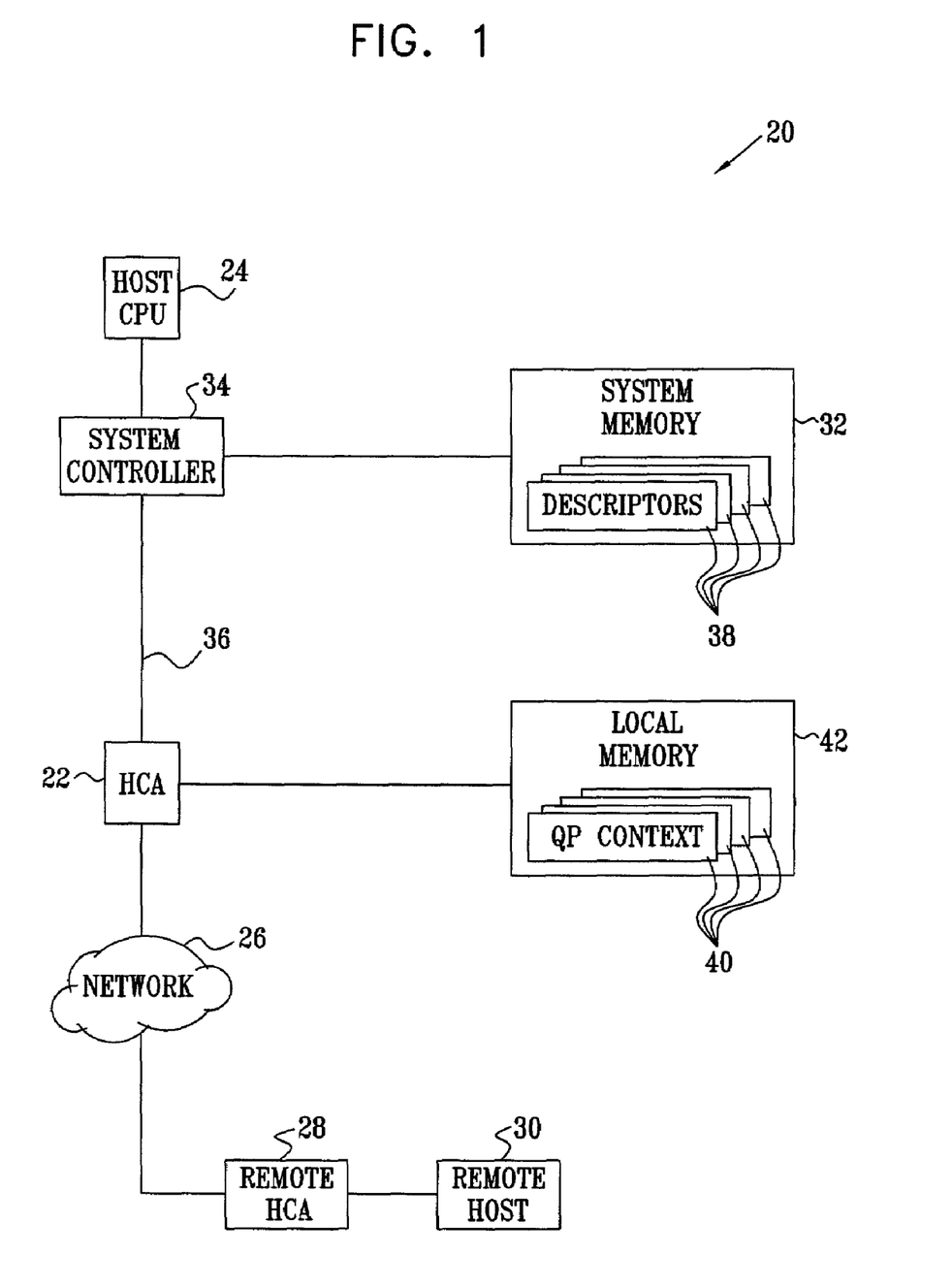
FIG. 1 is a block diagram that schematically illustrates a computer network communication system, in accordance with a preferred embodiment of the present invention.

FIG. 1 is a block diagram that schematically illustrates an InfiniBand (IB) network communication system 20, in accordance with a preferred embodiment of the present invention. In system 20, a host channel adapter (HCA) 22 couples a host processor 24 to an IB network (or fabric) 26. Typically, processor 24 comprises an Intel Pentium™ central processing unit (CPU) or other general-purpose computing device with suitable software. HCA 22 typically communicates via network 26 with other HCAs, such as a remote HCA 28 connected to a remote host 30, as well as with target channel adapters (TCAs), connected to input/output devices and other peripherals (not shown in the figures).

Host 24 and HCA 22 are connected to a system memory 32 by a suitable system controller 34 via a bus 36, such as a Peripheral Component Interface (PCI) bus, as is known in the art. The HCA and memory typically occupy certain ranges of physical addresses in a defined address space on the bus. In addition to the host operating system, applications and other data, memory 32 holds data structures that are accessed and used by HCA 22. These data structures preferably include descriptors 38 written to the memory by host processes, indicating messages to be sent by HCA 22. Further aspects of system 20 and specifically of the data structures maintained in memory 32 are described in a patent application entitled, "Network Interface Adapter with Shared Data Send Resources," filed Dec. 4, 2001, which is assigned to the assignee of the present patent application and whose disclosure is incorporated herein by reference.

In addition to the data structures maintained in system memory 32, certain data structures that HCA 22 must access with particular frequency are preferably held in an additional off-chip local memory 42, coupled directly to the HCA. The HCA accesses these structures using a double-data-rate memory controller (not shown in the figures), rather than via system bus 36. Most preferably, HCA 22 is configured so that host processor 24 can also access local memory 42 using normal addressing on bus 36. Thus, data structures can be distributed between system memory 32 and local memory 42 on the basis of convenience and speed, in a manner transparent to host 24 and without affecting the functional operation of the HCA and of system 20.

Local memory 42 contains queue pair (QP) context information 40 for each of a plurality of QPs served by HCA 22. Certain aspects of the structure and use of QP context information 42 are described in greater detail in a U.S. patent application entitled "Multiple Queue Pair Access with a Single Doorbell," filed Nov. 26, 2001, and in another U.S. patent application entitled "Queue Pair Context Cache," filed Jan. 23, 2002. Both of these applications are assigned to the assignee of the present patent application, and their disclosures are incorporated herein by reference.

Figure 2:
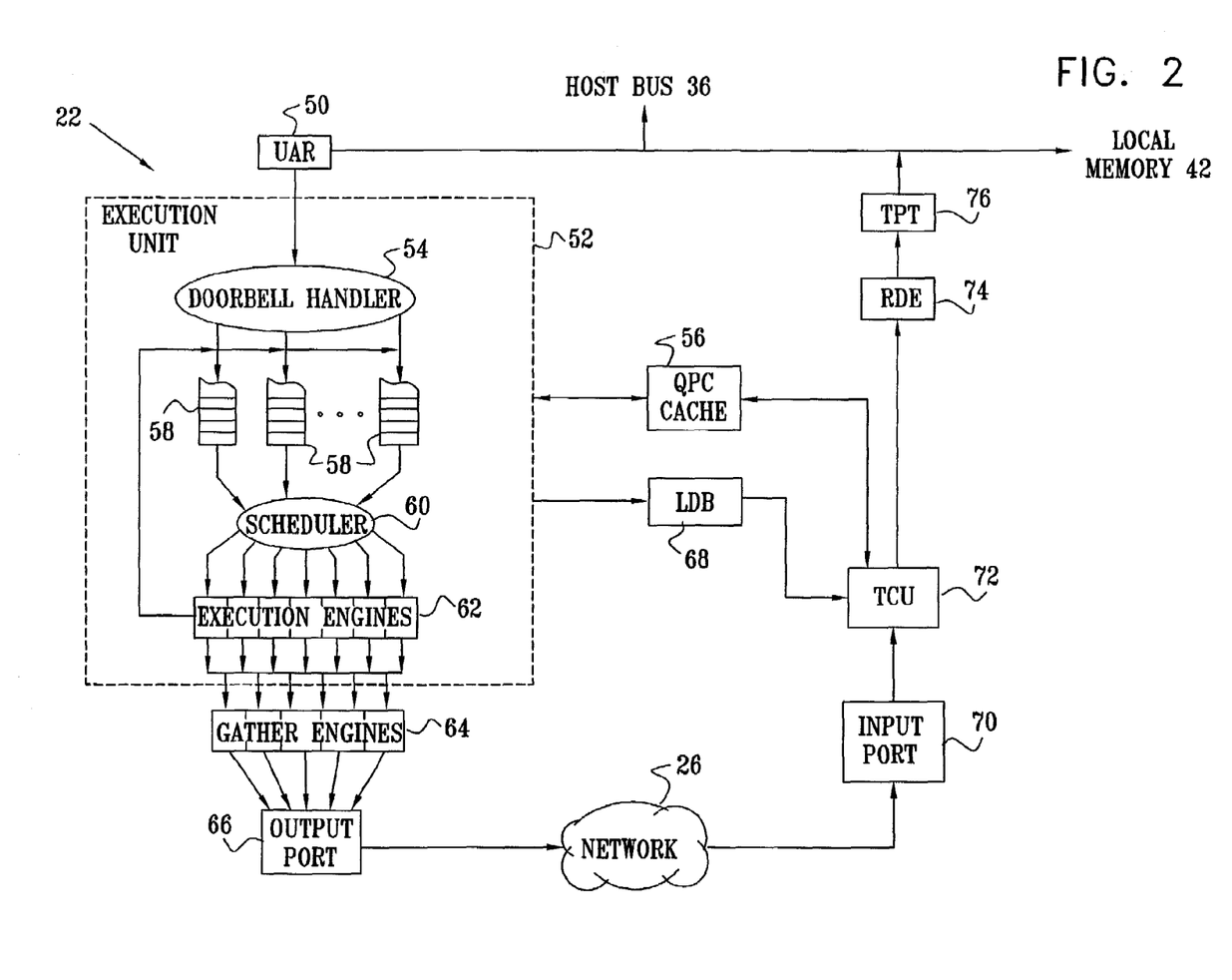
FIG. 2 is a block diagram that schematically illustrates a host channel adapter (HCA), in accordance with a preferred embodiment of the present invention.

FIG. 2 is a block diagram that schematically shows details of HCA 22, in accordance with a preferred embodiment of the present invention. For the sake of simplicity, not all the interconnections between the blocks are shown in the figure, and some blocks that would typically be included in HCA 22 are omitted because they are inessential to an understanding of the present invention. The blocks and links that must be added will be apparent to those skilled in the art. The various blocks that make up HCA 22 may be implemented either as hardware circuits or as software processes running on a programmable processor, or as a combination of hardware- and software-implemented elements. Although certain functional elements of HCA 22 are shown as separate blocks in the figure for the sake of conceptual clarity, the functions represented by these blocks may actually be carried out by different software processes on a single processor. Preferably, all the elements of the HCA are implemented in a single integrated circuit chip, but multi-chip implementations are also within the scope of the present invention.

In order to send out packets from HCA 22 on a given queue pair (QP) over network 26, host 24 posts work requests (WRs) for the QP by writing descriptors 38 to memory 32 (FIG. 1). For RDMA write and send requests, the descriptors indicate the source of the data to be sent and its destination. The data source information generally includes a "gather list," pointing to the locations in memory 32 from which the data in the outgoing message are to be taken. Typically, each entry in the gather list comprises an address, indicating the start point for the memory read, and a count, indicating the number of bytes to be read from the memory for this entry. After host 24 has prepared one or more descriptors, it "rings a doorbell" of HCA 22, by writing to an assigned address in a user access region (UAR) 50 of the HCA. The doorbell thus serves as an interface between host 24 and HCA 22, for notifying the HCA that there are descriptors 38 awaiting execution on a particular QP. The process of ringing and servicing doorbell 50 is described in detail in the above-mentioned patent applications.

When the doorbell is rung for a given QP, an execution unit 52 in HCA 22 takes charge of handling the work queue elements (WQEs) initiated by the WRs submitted by host 24. In response to the doorbell, a doorbell handler 54 enters the QP in one of a plurality of schedule queues 58 that it maintains. Each QP is preferably assigned in advance to a certain schedule queue, and the assignment is recorded in QP context 40 (FIG. 1). Preferably, for efficiency of execution, some or all of the QP context (QPC) information for QPs in the schedule queues is loaded from local memory 42 into a cache memory 56 in HCA 22. Each of schedule queues 58 can have a different class of service, or priority level, and the assignment of the QPs to respective schedule queues most preferably depends on the service class of the QP. A scheduler 60 arbitrates among schedule queues 58 in accordance with the assigned service classes.

Each QP that scheduler 60 selects for service is passed to one of an array of execution engines 62, preferably implemented as hardware logic units. The execution engine begins processing the outstanding WQEs of the QP that is at the head of the schedule queue. While processing the WQEs, the execution engine regularly updates relevant parameters in the QP context held in cache 56. It typically continues to process the WQEs of this QP until one of the following conditions occurs:

No more outstanding WQEs remaining to be executed in the QP send queue.

No HCA resources available to execute the next WQE.

Occurrence of a QP-specific condition or error that prevents execution.

Scheduler preemption by a higher-priority service.

A scheduler policy limit has been reached for this QP, such as the number of requests executed, packets or bytes sent, or time elapsed.

When the stop condition is reached, execution engine 62 records any remaining changes in the corresponding QP context 40, waits for outstanding packets to be actually sent (by gather engines 64, as described below), and then reports to scheduler 60 that it is idle and ready to receive a new QP assignment. At this stage, if the stopped QP has any WQEs still outstanding, a descheduler process in execution unit 52 places the QP at the end of the respective schedule queue for future reassignment to one of the execution engines. Further details of these scheduling and descheduling processes are described in a U.S. patent application entitled, "Handling Multiple Network Transport Service Levels with Hardware and Software Arbitration," filed Jan. 23, 2002, which is assigned to the assignee of the present patent application and whose disclosure is incorporated herein by reference.

Upon its assignment to service a given QP, execution engine 62 fetches from memory 32 descriptors 38 of the WQEs belonging to the QP. Access to the memory is controlled by a translation and protection table (TPT) 76, which serves as a further element of the host interface of HCA 22, performing address translation and protection checks. The assigned execution engine parses each descriptor in order to prepare gather entries to submit to an array of gather engines 64. Each gather entry defines a specific piece of header or payload data for inclusion in a packet to be prepared and sent out by the HCA. For RDMA write and send requests, some of the gather entries include a pointer to the data in memory 32 that are to be included in the packet payload. A single WQE specifying a large volume of data to transmit is preferably broken up by the execution engine into multiple gather entries, such that each gather entry requires the gather engine to perform no more than a single memory read, which does not cross a memory protection (page) boundary. (Preferably, each gather entry results in generation of no more than a single packet.) The assigned gather engine retrieves the data indicated by the gather entry from memory 32 by direct memory access (DMA) and loads the data into a data packet.

Gather entries that specify the contents of packet header fields are generally of the "immediate" type, meaning that they already contain the data for gather engines 64 to place in the packet and do not require a memory read. One of these header fields is the AckReq bit, as provided by the IB specification. As described in the Background of the Invention, when this flag is set in a given packet, it indicates to the responder (such as remote HCA 28—FIG. 1) that the packet must be explicitly acknowledged, even if the packet is not the last one in a message. In preparing the gather entries that specify the packet headers, execution engines 62 set the AckReq bit in accordance with certain criteria, which are described in greater detail below with reference to FIG. 3. At least one of these criteria is preferably specified in QP context 40, by an "AckReqFreq" parameter that indicates a minimum frequency with which acknowledgments should be requested. In other words, AckReqFreq specifies a maximum number of packets that can be sent without requesting acknowledgment, after which the AckReq bit must be set in the next packet. After setting the AckReq bit in the header of a given packet, the execution engine writes the packet sequence number (PSN) of the packet to the QP context, for subsequent use in verifying that the desired acknowledgment is received. Preferably, when more than one acknowledgment request is outstanding, the QP context stores only the PSN of the last packet in which AckReq bit was set.

After gather engine 64 has assembled the packet header and payload data, it passes the packet to a channel adapter link output 66, which performs link layer functions and submits the packet to an IB transmit queue for transmission over network 26. When the last packet required by a given WQE has been sent, execution unit 52 writes an entry in a local database (LDB) 68. A completion engine in a transport check unit (TCU) 72 reads the entries from the LDB in order to write completion reports to memory 32, as mandated by the IB standard. These reports inform the client processes on host 24 that their work requests have been completed. For unreliable services, the completion reports can be written immediately, while for reliable services, the report is written only after acknowledgment is received from the network that all the packets in the message were received.

Packets sent to HCA 22 over network 26 are received at an input port 70, which performs data link and buffering functions, as are known in the art. The stream of incoming packets typically includes both responses to request packets sent out by HCA 22 and incoming requests from other entities on the network. TCU 72 processes and verifies transport-layer information contained in the incoming packets, including verifying that the proper acknowledgments are received for request packets sent using reliable transport services. When TCU 72 receives a positive acknowledgment (ACK), it updates QP context 40 to indicate that descriptors 38 have been successfully executed up to the point of the acknowledgment. In addition, when the TCU receives data that must be written to memory 32, such as in a read response message, it passes the data to a receive data engine (RDE) 74, which writes the data to the memory via TPT 76.

Preferably, QP context 40 for each QP includes a timeout value, indicating how long the TCU should wait for a response before timing out. An acknowledgment timer is started by execution engine 62 when it sends a packet with the AckReq bit set. When the TCU receives a response, it checks the PSN referenced in the response against the last PSN value for which an acknowledgment was requested. As noted above, this PSN value is recorded in the QP context, which is preferably held in cache 56 for as long as the QP is being actively serviced by HCA 22. If the PSN of the response is greater than or equal to the last PSN value, the TCU turns off the timer, since the last requested acknowledgment has now been received (explicitly or implicitly). If the PSN of the response is less than the last PSN value, however, the TCU simply restarts the timer and awaits the next acknowledgment. If a positive response is not received within the timeout period, or if a NACK is received, TCU 72 instructs execution unit 52 to start resending packets, beginning just after the last packet that was positively acknowledged. The acknowledgment checking functions of the TCU are described in greater detail below with reference to FIG. 4.

Figure 3:
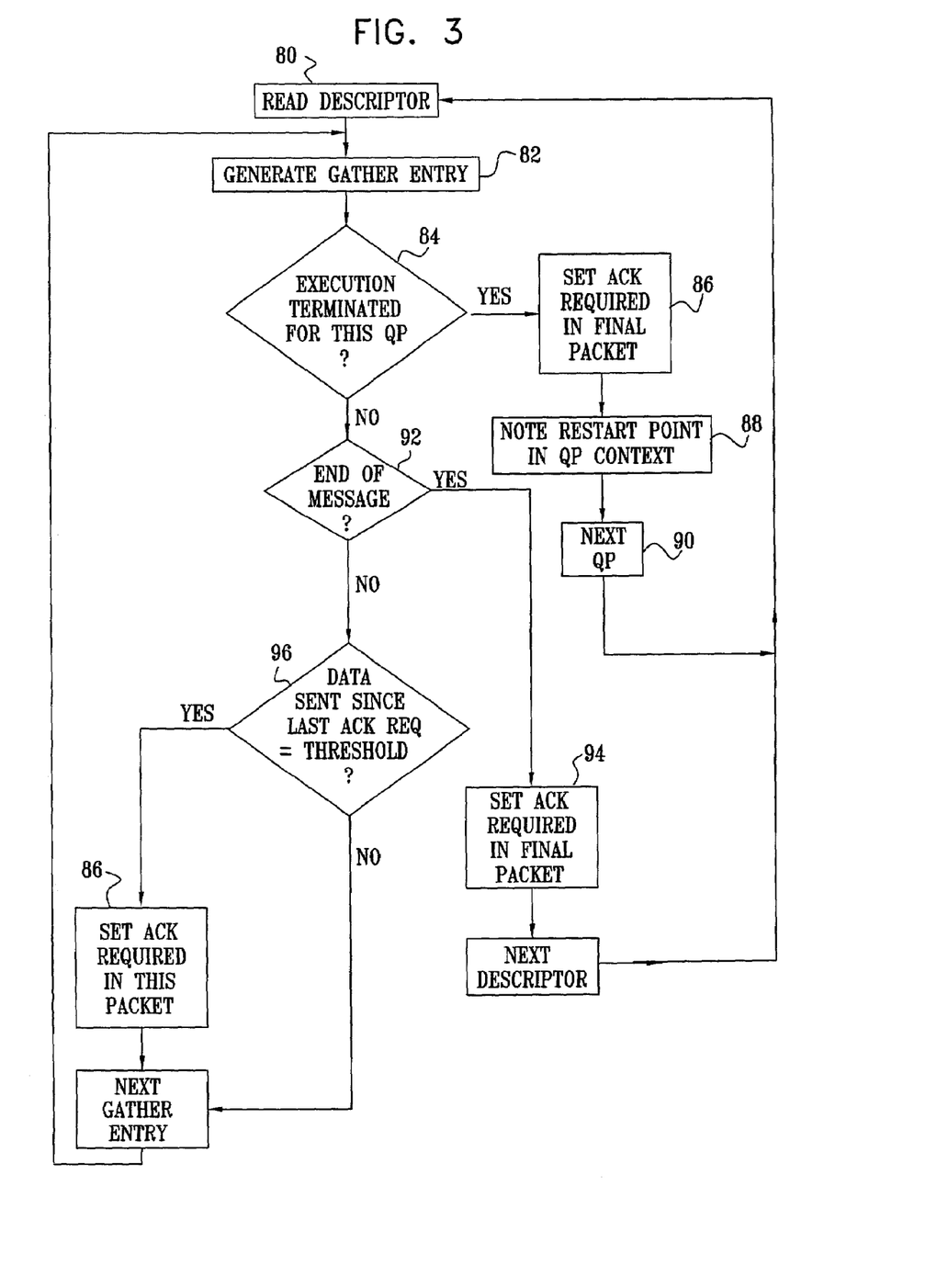
FIG. 3 is a flow chart that schematically illustrates a method for setting acknowledgment request indications in data packets generated by a HCA, in accordance with a preferred embodiment of the present invention.

FIG. 3 is a flow chart that schematically illustrates a method for generating acknowledgment requests in outgoing packets, in accordance with a preferred embodiment of the present invention. This method is used by execution unit 52 in determining which request packets should have the AckReq bit set, and in updating QP context 40 to enable tracking of acknowledgments and resending packets when necessary. As described above, execution engines 62 begin processing each new WQE by reading the corresponding descriptor 38, at a descriptor reading step 80. QP context 40 indicates at any time the next descriptor to be read by the execution engine. When the next descriptor contains a gather list whose execution was previously begun but not completed successfully, the QP context also indicates the point in the gather list at which execution is to resume. This packet-level stop/restart function is described below in greater detail with reference to FIG. 5.

Execution engine 62 reads the information in descriptor 38 and generates gather entries accordingly for one of gather engines 64, at a gather entry generation step 82. As noted above, for outgoing RDMA write and send requests, the execution engine often generates multiple gather entries for each descriptor, corresponding to the headers and payloads of the multiple request packets required to carry the request message.

Normally, execution engine 62 continues generating gather entries for outgoing request packets until all the outstanding WQEs for the current QP have been completed. As noted above, however, it may at times occur that execution for a given QP by one of execution engines 62 is terminated in the middle, at a termination step 84, before all the WQEs have been completed. Such termination may occur at the end of a message, i.e., after the last of the gather entries (or the only gather entry) corresponding to one of descriptors 38 has been prepared. Alternatively, the termination may occur in the middle of a message, before all the data indicated by the corresponding descriptor 38 have been packetized and transmitted. Such termination may be for a variety of reasons, including:

Preemption of the execution engine by scheduler 60.
Self-initiated termination by the execution engine after sending a maximum quota of data or encountering an error condition.
Instructions from TCU 72 due to a NACK or acknowledgment timeout, as described below.

When premature termination occurs, the execution engine immediately completes the last gather entry or entries needed in order to generate a final packet on the QP that the execution engine is currently serving. The execution engine sets the AckReq bit in the final packet header, at an AckReq setting step 86. As noted above, the execution engine records the PSN of this packet in the QP context for use by TCU 72 in acknowledgment tracking. When acknowledgments arrive from network 26, TCU 72 normally checks them against the QP context information in cache 56 in order to determine when the entire message operation has been completed. After all outstanding messages for a given QP have been completed, the TCU marks the entry for this QP in cache 56 as being no longer in use. The QP context information can then be cleared to make room in the cache for other QPs. In the case of premature termination in the middle of a message, however, TCU 72 waits only for the last requested acknowledgment with respect to the portion of the incomplete message that was sent before termination, and then marks the cache entry for this QP to indicate that it is no longer in use. The context information for this QP is reloaded in the cache, if necessary, when processing of the message subsequently resumes.

When execution of a descriptor has been terminated in the middle of the corresponding message, execution engine 62 also records in the QP context the number of bytes of data that have been sent so far from the gather list of the descriptor, up to and including the last packet before preemption, at a restart update step 88. This number of bytes is subsequently used to determine the restart point at which this or another one of the execution engines will resume servicing this descriptor from the middle the next time this QP is serviced. In this way, the need to restart from the beginning of the descriptor is avoided.

After gather engine 64 has received and executed the last gather entry generated by execution engine 62 upon termination at step 84, the execution engine reports to scheduler 60 that it is available for assignment to a new QP, at a reassignment step 90.

As long as execution for the current QP has not been terminated at step 84, the execution engine checks each packet to determine whether it is the last one in a given message, at an end-of-message checking step 92. If so, it preferably sets the AckReq bit in the header of this packet, at a final AckReq setting step 94, and records the PSN of the packet in QP context 40 for reference by TCU 72. If the acknowledgment timer is idle, the execution engine starts the timer at this point.

Alternatively, a more restrictive policy may be applied in deciding to set the AckReq bit in the final packet. For example, the AckReq bit may be set in the final message packet only if the current descriptor is the last one pending for this QP, or if the next message to be sent for this QP is not a RDMA write or send, or if there is no open entry available in LDB 68 for the next message. Alternative acknowledgment request policies will be apparent to those skilled in the art. Generally speaking, in determining the desired frequency of acknowledgment, such policies must balance the consumption of network and adapter resources in handling acknowledgments against the advantages of receiving acknowledgments at close intervals.

If execution is not terminated, and the current packet is not the last one in a message, execution engine 62 checks the number of packets that it has sent since the last AckReq packet, at a threshold checking step 96. If this number is equal to the AckReqFreq parameter in QP context 40, the execution engine sets the AckReq bit in the current packet to be sent on this QP, at AckReq setting step 86. (Alternatively, the execution engine may be configured to apply some other threshold criterion.) The execution engine also records the PSN of the last packet in which AckReq was set in the QP context for use by TCU 72 in acknowledgment tracking. The execution engine continues processing the current descriptor, and subsequent descriptors on the current QP, until a stop condition is reached or until all the outstanding work requests for the QP have been completed.

Figure 4:
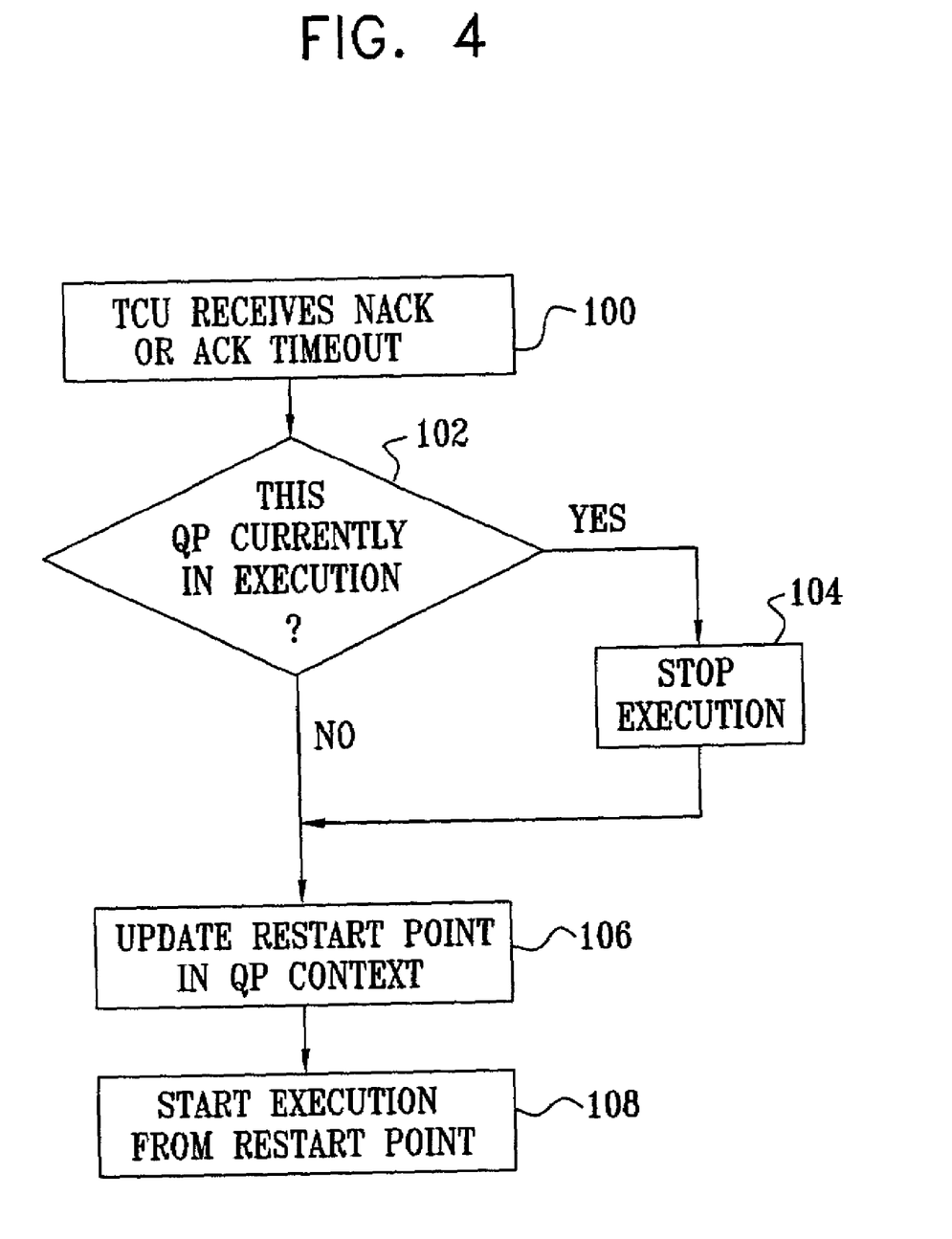
FIG. 4 is a flow chart that schematically illustrates a method for handling a failure to receive a positive response to an acknowledgment request, in accordance with a preferred embodiment of the present invention.

FIG. 4 is a flow chart that schematically illustrates the operation of TCU 72 when it fails to receive an expected ACK response, in accordance with a preferred embodiment of the present invention. The process shown in FIG. 4 is initiated when TCU 72 receives a NACK response or fails to receive the expected ACK response within the normal timeout period, at a non-acknowledgment step 100. As noted above, when the TCU receives the expected ACK responses on time, it simply updates QP context 40 to indicate the PSN of the last packet acknowledged, without affecting the ongoing operation of execution unit 52. Each time a response is received, the TCU either resets or turns off the acknowledgment timer, depending on the PSN referenced by the response, as described above. In the event of a NACK or timeout, however, TCU 72 preferably checks QP context 40 to determine whether this QP is still being serviced by the execution unit, at a service status checking step 102. If the QP is in service, the TCU instructs the execution unit to stop execution immediately, at a stopping step 104. Since all packets following the last acknowledged PSN must in any case be resent, stopping execution at this point helps to prevent waste of resources on sending packets that will have to be resent anyway. Optionally, in this case, the execution engine is not instructed to set the AckReq bit (at step 90—FIG. 3) in the last packet.

TCU 72 next updates the restart point for packet transmission on this QP in QP context 40, at a restart updating step 106. The restart point will indicate the next byte of data to be sent by execution unit 52, following the last byte of the last packet for which the TCU did receive a valid ACK. If the ACK was received for the final packet (or only packet) in a given message, the restart point will indicate the beginning of the next descriptor 38 for this QP. On the other hand, if the ACK was received for an intermediate packet in the middle of a longer message, in response to the AckReq bit having been set in such a packet at step 90 (FIG. 3), the restart point will be the next byte in the gather list of the corresponding descriptor 38, following the payload of the last intermediate packet that was acknowledged. Execution unit 52 will then restart its execution of this descriptor from the indicated point in the middle, at a restart step 108. TCU 72 preferably rings an internal doorbell in HCA 22 to inform doorbell handler 54 that the QP should be rescheduled in order to resend the non-acknowledged packets. The restart will then occur the next time scheduler 60 schedules this QP for service.

Figure 5:
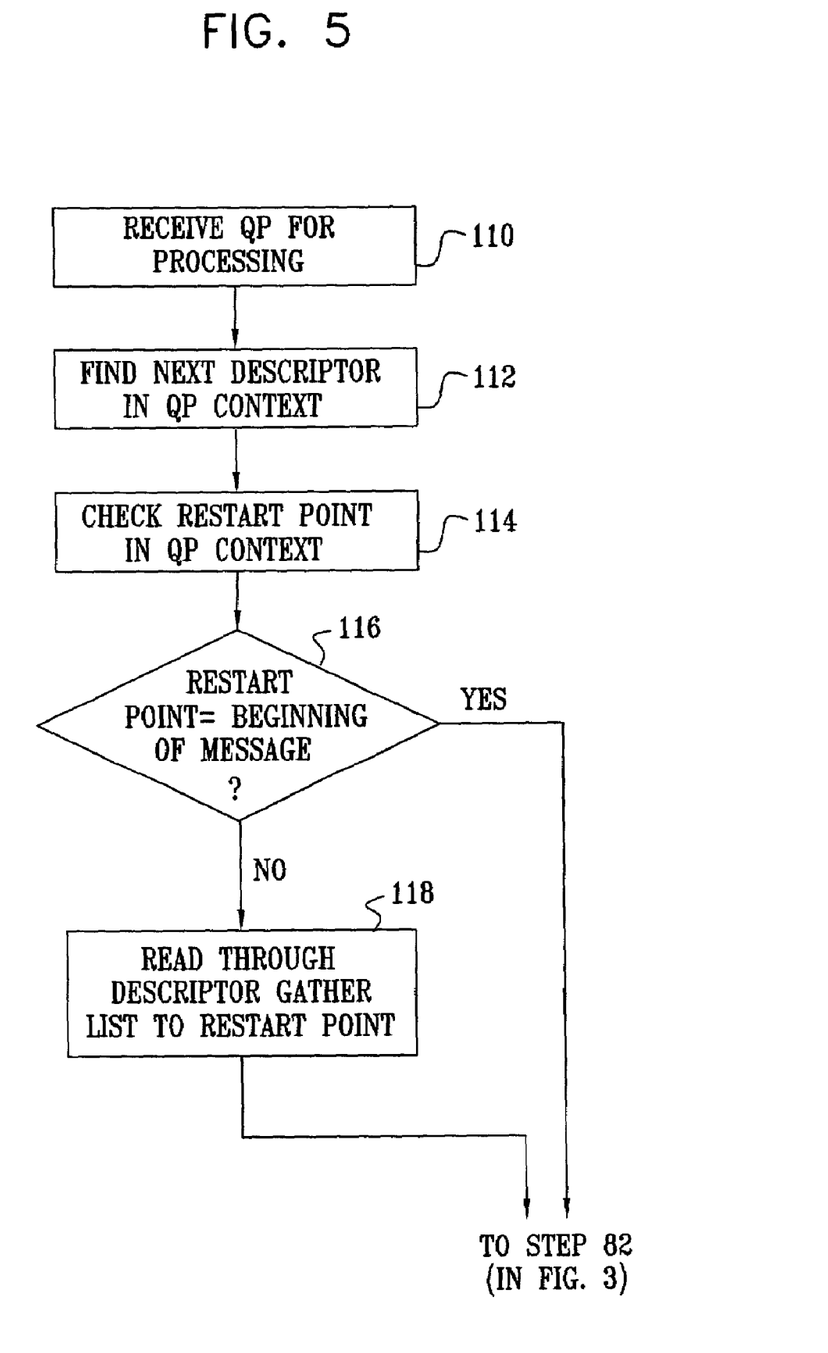
FIG. 5 is a flow chart that schematically illustrates a method for resuming transmission of packets after an interruption, in accordance with a preferred embodiment of the present invention.

FIG. 5 is a flow chart that schematically illustrates initiation of service of a given QP by one of execution engines 62, in accordance with a preferred embodiment of the present invention. Upon receiving a new QP for processing, at a QP initiation step 110, the execution engine checks the information in QP context 40. The execution engine first reads out the address of the next descriptor 38 to be processed on this QP, at a next descriptor identification step 112. It then checks the restart point for this descriptor, as recorded in the QP context, at a restart checking step 114. If this is the first descriptor submitted by host 24 on this QP, or if the last packet previously acknowledged on this QP was the final packet in a previous message, then the execution engine will determine that the current restart point is at the beginning of a message, at a restart point determination step 116. In this case, the execution engine simply reads and executes the descriptor from the beginning, and generates the appropriate gather entries at step 82 (FIG. 3), as described above.

On the other hand, the restart point may be at the middle of a descriptor if the last ACK received previously by TCU 72 was for an intermediate packet in the corresponding message. As described above, this situation typically arises when the TCU has encountered a NACK or ACK timeout, at step 100, or after execution of the descriptor was terminated before its completion, at step 84, for any of the reasons noted above. The restart point recorded in the QP context in this situation indicates how many bytes from the gather list of this descriptor were actually sent to the responder, up through termination. The execution engine reads through the gather list of the current descriptor, at a descriptor reading step 118, adding up the lengths of the data indicated by each of the entries in the list, until it reaches the restart point. It then begins generating gather entries from this point on.

Although preferred embodiments are described herein with reference to HCA 22 and IB fabric 26, and using particular features and terminology of IB fabrics and protocols, the principles of the present invention may similarly be applied, mutatis mutandis, using networks, network interface adapters and protocols of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for communication over a network, comprising:
receiving from a host processor a descriptor defining a message comprising message data to be sent over the network;
responsive to the descriptor, generating a sequence of packets each containing a respective portion of the message data, the sequence ending in a final packet containing a final portion of the message data;
entering in a selected packet among the packets in the sequence, other than the final packet, an indication requesting that a recipient of the packets acknowledge the selected packet;
sending the packets in the sequence to the recipient; and
following an interruption in the sequence of the packets subsequent to the selected packet, resuming sending the packets in the sequence beginning after the selected packet.

2. A method according to claim 1, wherein receiving the descriptor comprises receiving a work request (WR) from the host processor, and wherein generating the sequence of the packets comprises executing a work queue item (WQE) responsive to the work request.

3. A method according to claim 2, wherein executing the WQE comprises placing the WQE in a send queue of a queue pair (QP) associated with a reliable transport service provided by the network.

4. A method according to claim 3, wherein entering the indication in the selected packet comprises noting a packet sequence number (PSN) of the selected packet in context data associated with the QP, and comprising receiving an acknowledgment of the selected packet from the recipient, responsive to the indication, and updating the context data responsive to the acknowledgment.

5. A method according to claim 1, wherein entering the indication in the selected packet comprises setting an acknowledgment request flag in a header of the selected packet.

6. A method according to claim 1, wherein receiving the descriptor comprises receiving a gather list, indicating addresses and lengths of the message data in a memory, and wherein generating the sequence of the packets comprises reading the message data from the memory responsive to the gather list, and wherein entering the indication in the selected packet comprises noting a point in the gather list corresponding to the message data contained in the selected packet.

7. A method according to claim 6, wherein resuming sending the packets comprises generating the packets in the sequence beginning from the noted point in the gather list.

8. A method according to claim 1, wherein entering the indication in the selected packet comprises selecting the packet in which to enter the indication responsive to a predetermined quantity of the data having been sent since a preceding one of the packets in the sequence that contained the indication was sent to the recipient.

9. A method according to claim 8, wherein selecting the packet comprises setting a parameter indicating a threshold number of the packets, and wherein selecting the packet comprises setting the indication in at least one of the packets in the sequence every time the threshold number of the packets is sent.

10. A method according to claim 1, wherein entering the indication comprises receiving an instruction to discontinue generating the packets in the sequence before generating the final packet, and entering the indication in the packet at which generating the packets is discontinued.

11. A method according to claim 10, wherein receiving the descriptor comprises receiving a first work request to be executed on a first transport service instance having a first priority, and wherein receiving the instruction to discontinue generating the packets comprises preempting generation of the packets for the first transport service instance in order to execute a second work request on a second transport service instance having a second priority, higher than the first priority.

12. A method according to claim 10, wherein receiving the descriptor comprises receiving a first work request to be executed on a first transport service instance, and wherein receiving the instruction to discontinue generating the packets comprises determining that a quantity of the data sent on the first transport instance has reached a predetermined threshold, whereupon generation of the packets for the first transport service instance should be terminated in order to execute a second work request on a second transport service instance.

13. A method according to claim 1, and comprising receiving an acknowledgment of the selected packet from the recipient, responsive to the indication, wherein resuming sending the packets in the sequence comprises choosing a point in the sequence after the selected packet with which to resuming sending the packets, responsive to having received the acknowledgment.

14. A method according to claim 13, wherein entering the indication in the selected packet comprises noting an identification of the selected packet in contexts data used in generating the packets, and wherein receiving the acknowledgment comprises updating the context data responsive to the acknowledgment, so as to indicate the point in the sequence at which to resume sending the packets following the interruption.

15. A method according to claim 13, wherein resuming sending the packets comprises resending the packets following the selected packet responsive to failing to receive the acknowledgment of a further packet in the sequence subsequent to the selected packet.

16. A method according to claim 15, wherein failing to receive the acknowledgment comprises failing to receive the acknowledgment within a predetermined timeout period.

17. A method according to claim 15, wherein failing to receive the acknowledgment comprises receiving a response from the recipient reporting that it did not properly receive one of the packets in the sequence subsequent to the selected packet.

18. A method according to claim 15, wherein resuming sending the packets comprises, responsive to failing to receive the acknowledgment of the further packet, interrupting generating the sequence of packets, so as to resend the packets following the selected packet.

19. An interface device for communication over a network, comprising:
   a host interface, adapted to receive from a host processor a descriptor defining a message comprising message data to be sent over the network;
   an execution unit, coupled to the host interface and adapted, responsive to the descriptor, to generate a sequence of packets each containing a respective portion of the message data, the sequence ending in a final packet containing a final portion of the message data, such that an indication requesting that a recipient of the packets acknowledge the selected packet is entered in a selected packet among the packets in the sequence, other than the final packet, the execution unit being further adapted, following an interruption in the sequence of the packets subsequent to the selected packet, to resume sending the packets in the sequence beginning after the selected packet; and
   a network interface, coupled to the execution unit so as to send the packets in the sequence to the recipient over the network and to receive an acknowledgment of the selected packet sent by the recipient in response to the indication in the selected packet.

20. A device according to claim 19, wherein the descriptor is submitted by the host processor to the interface device as a work request (WR), causing the execution unit to execute a work queue item (WQE) responsive to the work request.

21. A device according to claim 20, wherein the execution unit is adapted to place the WQE in a send queue of a queue pair (QP) maintained by the execution unit, wherein the QP is associated with a reliable transport service provided by the network.

22. A device according to claim 21, wherein the execution unit is adapted to record a packet sequence number (PSN) of the selected packet in context data associated with the QP, and comprising a transport check unit, which is coupled to receive the acknowledgment from the network interface and to update the context data responsive to the acknowledgment.

23. A device according to claim 19, wherein the indication comprises an acknowledgment request flag, which is set in a header of the selected packet to request that the recipient acknowledge the selected packet.

24. A device according to claim 19, wherein the descriptor comprises a gather list, indicating addresses and lengths of the message data in a memory, and wherein the execution unit is adapted to read the message data from the memory responsive to the gather list, and to note a point in the gather list corresponding to the message data contained in the selected packet.

25. A device according to claim 24, wherein to resume sending the packets following the interruption, the execution unit is adapted to generate the packets in the sequence beginning from the noted point in the gather list.

26. A device according to claim 19, wherein the execution unit is adapted to select the packet in which to enter the indication responsive to a predetermined quantity of the data having been sent since a preceding one of the packets in the sequence that contained the indication was sent to the recipient.

27. A device according to claim 26, wherein the predetermined quantity of the data is determined by a parameter indicating a threshold number of the packets, such that the indication in at least one of the packets in the sequence every time the threshold number of the packets is sent.

28. A device according to claim 19, wherein the execution unit is adapted to receive an instruction to discontinue generating the packets in the sequence before generating the final packet, and to enter the indication in the packet at which it discontinues generating the packets is discontinued.

29. A device according to claim 28, wherein the descriptor corresponds to a first work request to be executed on a first transport service instance having a first priority, and wherein generating the packets for the first transport service instance is discontinued in order to enable the execution unit to execute a second work request on a second transport service instance having a second priority, higher than the first priority.

30. A device according to claim 28, wherein the descriptor corresponds to a first work request to be executed on a first transport service instance, and wherein generating the packets for the first transport service instance is discontinued upon determining that a quantity of the data sent on the first transport instance has reached a predetermined threshold, in order to enable the execution unit to execute a second work request on a second transport service instance.

31. A device according to claim 19, wherein the execution unit is adapted to choose a point in the sequence after the selected packet with which to resume sending the packets responsive to the acknowledgment having been received from the recipient of the selected packet in response to the indication.

32. A device according to claim 31, wherein the execution unit is adapted to note an identification of the selected packet in context data used in generating the packets, and comprising a transport check unit, which is coupled to receive the acknowledgment from the network interface and to update the context data responsive to the acknowledgment, so as to indicate the point in the sequence at which to resume sending the packets following the interruption.

33. A device according to claim 31, wherein the execution unit is adapted to resend the packets following the selected packet responsive to a failure to receive at the network interface the acknowledgment of a further packet in the sequence subsequent to the selected packet.

34. A device according to claim 33, wherein the failure to receive the acknowledgment of the further packet is considered to have occurred when the acknowledgment is not received within a predetermined timeout period.

35. A device according to claim 33, wherein the failure to receive the acknowledgment of the further packet is considered to have occurred when a response is received from the recipient reporting that the recipient did not properly receive one of the packets in the sequence subsequent to the selected packet.

36. A device according to claim 33, and comprising a transport check unit, which is coupled to detect the failure to receive the acknowledge, and responsive thereto, to interrupt generation of the sequence of packets by the execution unit, so as to cause the execution unit to resend the packets following the selected packet.

* * * * *